United States Patent [19]

Welker et al.

[11] Patent Number: 4,777,567
[45] Date of Patent: Oct. 11, 1988

[54] OPTICAL INSPECTION APPARATUS

[75] Inventors: Robert H. Welker, Sugar Land; Ken Smith, Houston, both of Tex.

[73] Assignee: Welkee Engineering Company, Sugar Land, Tex.

[21] Appl. No.: 897,195

[22] Filed: Aug. 15, 1986

[51] Int. Cl.⁴ .............................................. F21V 7/04
[52] U.S. Cl. ...................................... 362/32; 350/506
[58] Field of Search ............................ 362/32; 350/506

[56] References Cited

U.S. PATENT DOCUMENTS

| | | | |
|---|---|---|---|
| 2,028,430 | 1/1936 | Baddorf et al. | 350/506 |
| 2,251,739 | 8/1941 | Huntsinger | 350/506 |
| 2,363,701 | 11/1944 | Soetbeer | 350/506 |
| 2,437,458 | 3/1948 | Crampton | 350/506 |
| 2,609,728 | 9/1952 | Cadwell | 350/506 |
| 2,899,856 | 8/1959 | Shull | 88/14 |
| 3,155,761 | 11/1964 | Rubens et al. | 88/14 |
| 3,297,022 | 1/1967 | Wallace | 128/6 |
| 3,450,481 | 6/1969 | Kramp et al. | 356/241 |
| 3,496,348 | 2/1970 | Lowery | 362/139 |

OTHER PUBLICATIONS

Olympus Corporation, "The Inside Story-Focus on Inspection", p. 2, The AXL-100 Explosion-Proof Light Source, 1984, apparently published in the U.S.A.
Olympus Optical Co., Ltd., "Olympus Industrial Fiberscopes Model IF", pp. 1-8, date unknown, printed in Japan.
Olympus Corporation, "New Olympus Mark II Borescopes", pp. 1-4, date unknown, printed in the U.S.A.
Lenox Instrument Company, "Lenox Explosion-Proof Borescope Light Source ", pp. 1 and 2 1983, printed in the U.S.A.
Lenox Instrument Company, "Lenox Extendable Borescopes", pp. 1-6, date unknown, apparently published in the U.S.A.
Lenox Instrument, "View-A-Pipe", pp. 1 and 2, date unknown, apparently published in the U.S.A.
Applied Fiberoptics, Inc., "Clad Rod", p. 1, date unknown, apparently published in the U.S.A.
Applied Fiberoptics, "Your Imagination is Our Only Limitation", pp. 1 and 2, date unknown, apparently published in the U.S.A.
Applied Fiberoptics, "The Clear Choice in Fiberoptics", pp. 1-6, date unknown, apparently published in the U.S.A.
Applied Fiberoptics, Inc., "Fiberoptic Light Guides, Assemblies, Light Sources, Custom Design Services", pp. 1-4, 1982, printed in the U.S.A.
Richard Wolf Medical Instruments Corp., "Borescope Light Projectors", 1980, printed in the U.S.A.
Richard Wolf GmbH, "Wolf Technoscopes", pp. 1-31, date unknown, place of publication unknown.
AO Scientific Instruments, "Two Borescopes in One", pp. 1 and 2, date unknown, printed in the U.S.A.
AO Scientific Instruments, "AO Micro Fiberscopes", pp. 1 and 2, date unknown, printed in the U.S.A.

(List continued on next page.)

Primary Examiner—Margaret A. Focarino
Attorney, Agent, or Firm—Gunn, Lee & Jackson

[57] ABSTRACT

The optical inspection apparatus consists of an explosion-proof light projector and a viewing periscope. In one embodiment, an external power source connects to an explosion-proof housing protectively enclosing a lamp. In another embodiment, the lamp, batteries, and a circuit are included within the explosion-proof housing, providing a fully portable, self-contained and explosion-proof light projector. A viewing periscope is provided for examination of meter tubes, tanks vessels and other enclosed machinery. An explosion-proof connector is also disclosed providing an explosion-proof and thermally resistant interface between a light source and a fiberoptic light guide. A timing circuit is also disclosed prolonging the operation time of the light projector on one charge of the battery.

11 Claims, 7 Drawing Sheets

OTHER PUBLICATIONS

AO Scientific Instruments, "AO Flexible Fiber Optic Long Fiberscope 29 Ft.", pp. 1 and 2, date unknown, printed in the U.S.A.

Dainichi-Nippon Cables, Ltd., "Diaguide Scope", pp. 1-13, date unknown, printed in Japan.

Titan Tool Supply Company, Inc., "G Miniature Series Borescopes", pp. 1-4, July 1, 1983, apparently printed in the U.S.A.

Karl Storz Endoscopy-America, Inc., "Illumination/-Documentation Catalog 1984 Ed.", pp. 1-21, 1984, place of printing unknown.

Karl Storz GmbH & Co., "Hopkins Rod Lens Telescope Instruction Manual", pp. 1-12, date unknown, place of printing unknown.

Dolan-Jenner Industries, Inc., "Electronic Controls Fiber Optics", pp. 1-31, date unknown, apparently printed in the U.S.A.

Fiberoptics Technology Incorporated, Untitled Catalog, pp. 1-7, date unknown, printed in the U.S.A.

Reichert Fiber Optics, "Reichert Fiber Optics Flexible Industrial Fiberscope Model FS-2102", pp. 1 and 2, date unknown, printed in the U.S.A.

Reichert Fiber Optics, "Reichert Fiber Borescope Model FB 250A and FB 550", pp. 1 and 2, date unknown, printed in the U.S.A.

Reichert Fiber Optics, "Reichert Illuminators", pp. 1 and 2, date unknown, printed in the U.S.A.

OPTICAL INSPECTION APPARATUS

BACKGROUND OF THE DISCLOSURE

1. Field of the Invention

The optical inspection apparatus incorporates two primary components, i.e., an explosion-proof light projector and a viewing periscope. The optical inspection apparatus is intended for use in an explosive environment including but not limited to natural gas pipelines and metering stations connected to natural gas pipelines. The invention could also be used in any other explosive environment such as the interior of tanks or vessels containing petrochemicals or other explosive fluids for non-destructive inspection thereof. This invention is not intended to be used as a medical instrument for the examination of humans or animals.

One embodiment of this invention must be connected to an external power source, 110 VAC current. An alternative embodiment is powered by batteries protectively enclosed within an explosion-proof housing. This alternative embodiment is portable and can be used in remote locations where conventional external power sources are unavailable or in other locations where portable AC generators are contraindicated or not readily available. Both embodiments are specially constructed for use in an explosive environment although they would also be equally operable in a nonexplosive environment.

2. Description of the Prior Art

Various efforts have been made to develop portable explosion-proof optical inspection devices including, but not limited to, U.S. Pat. application Ser. No. 771,349 filed on Aug. 30, 1985, by Robert H. Welker and now U.S. Pat. No. 4,678,290. The present invention presents several advantages not found in the aforementioned patent application. In the prior application, a light bulb is mounted in a reflector inside the periscope. Light from the bulb is reflected by a mirror through an aperture to the exterior of the periscope. The periscope of the prior application is typically inserted into an explosive environment such as a natural gas pipeline. The light bulb itself and the electrical connection with the wires is blanketed in a nitrogen atmosphere to prevent an explosion in the event of a spark. As a further precaution, the light bulb and reflector assembly is further isolated from the explosive environment by a clear lens.

The present invention does not insert a light bulb in to the explosive environment, nor are any wires carrying electricity immersed in the gas stream inside a pipeline. Therefore, the present invention is capable of using a much brighter light bulb, 150 watts, than the 18 watt bulb typical of the apparatus of the invention disclosed in the aforementioned application. A brighter light source allows inspection at greater distances from the periscope. A brighter light source is particularly advantageous when examining the interior of non-illuminated cavities which are often coated with dark irregular deposits such as those accumulations frequently found on the interior of meter tubes.

The apparatus of the prior application has a nominal outside diameter of one inch and is therefore capable of being inserted into a one inch NPT fitting or coupling having a nominal inside diameter of 1 5/32 inches. Unfortunately there are more ½ inch NPT fittings available in actual field situations than 1 inch NPT fittings. Both the viewing periscope and the light probe of the preferred embodiment of this invention have a nominal outside diameter of 11/16 inches which can be inserted into a ½ inch NPT fitting which has a nominal inside diameter of 23/32 inches. The apparatus of the present invention has a smaller diameter than the preferred embodiment of the prior application and therefore has a much greater range of practical application because of the greater availability of ½ inch NPT fittings in actual field situations.

The present embodiment is smaller in diameter and yet has a brighter light than the apparatus disclosed in the prior application. These advantages are particularly relevant when many of the fittings currently in field use are ½ inch NPT. It should be obvious from the foregoing discussion that devices with unusually large diameters such as two inches could project brighter lights than the present invention and the prior application. However there are very few two inch fittings in meter tubes or any other field application. The present application is therefore a strategic compromise between brilliance and size. The present application is believed to have the brightest light for its size of any apparatus developed to date which is battery powered and explosion-proof.

Various other types of primitive inspection devices have been known in the art for at least 50 years. U.S. Pat. No. 2,028,430 discloses an oil tank inspection device contained within an elongate tube housing both a light source and a mirror for examination of the interior of said tank. U.S. Pat. No. 2,437,458 discloses an inspection periscope including a light source and mirror for visual inspection of drums or pipes. Both of these devices are not suitable for explosive environments.

More modern devices such as the endoscope disclosed in U.S. Pat. No. 3,297,022 rely upon fiberoptic light guides for light transmission. Such devices are well suited in medical applications for examining objects no more than a few inches from the tip of the endoscope. However, the amount of light capable of being transmitted through the medical instrument disclosed in U.S. Pat. No. 3,297,022 is insufficient for industrial applications. In medical applications, the object to be observed is often less than an inch away from the light source. In industrial applications, the object to be observed will often be several feet or several yards from the light source. Light intensity, therefore, is critical in industrial applications where the object to be examined is far removed from the light source.

The length of a meter station will increase with the size of the pipeline. For example, a two inch diameter pipeline will typically have a meter tube length of approximately 20 feet; an 18 inch diameter pipeline will typically have a meter tube length of approximately 60 feet. Additional connective piping including a spool will further increase the length of the meter station. Such great lengths suggest increased light intensities.

The present invention discloses a brilliant light source contained in an explosion-proof housing which is capable of illuminating the entire distance of a typical meter station up to 60 feet in length; these features are not disclosed in the prior art. Other U.S. patents disclosing various types of optical inspection devices are disclosed in the information disclosure statement filed herewith.

Olympus Corporation apparently manufactures a portable explosion-proof illuminator which is listed with Underwriters Laboratories. The Olympus AXL-100 Explosion-Proof Light Source is not battery powered. The Olympus device must be plugged into an external energy source. One embodiment of the present invention discloses an explosion-proof light projector which is powered by self-contained batteries, which is highly portable and can be taken to any remote location. The Olympus illuminator must be connected to a fiberoptic light guide to function as a light projector such as that disclosed herein.

Lennox Instruments advertises an explosion-proof borescope light source, which also requires a remote power supply.

Other types of borescopes and various industrial inspection devices are also disclosed in the Information Disclosure Statement filed herewith.

The goal for one embodiment of the present invention is to provide a portable battery powered explosion-proof optical inspection device which possesses the following characteristics: First, the intensity of light must be bright enough to conduct a thorough inspection up to 60 feet away from the probe under adverse conditions such as a highly contaminated non reflective meter tube or pipeline. Second, the device should be able to operate at sustained brilliance for 25 to 30 minutes on one charge of the battery. Third, the device must not thermally damage the recharging capability of the batteries. Fourth, the device should be small enough to fit into a ½ inch NPT fitting. Combining all of these characteristics in a portable explosion-proof apparatus is a significant advance in the art.

Time of operation on one battery charge is important for practical field applications. It is estimated that during one day of field inspection of meter tubes the optical inspection device will only be in operation for approximately 25 to 30 minutes. The remainder of the day will be spent driving from one meter station to another in which case the optical inspection device will not be in use. Other activities such as cleaning dirty tubes will occupy the remainder of a typical day. At the end of the day, the device can be returned to the shop and fully recharged. From a practical perspective the optical inspection device must have sufficient energy to function at a sustained level during a typical day of use by field personnel; 25-30 minutes of operating capacity normally suffices.

SUMMARY OF THE INVENTION

The optical inspection apparatus disclosed herein consists of an explosion-proof light projector and a viewing periscope. In one embodiment the light projector relies upon an external AC power source to energize the lamp. In another embodiment which is portable, an explosion-proof housing protectively encloses batteries which energize the lamp and a circuit means which prolongs the length of time that the projector can be operated on one charge of the batteries. A fiberoptic light guide connects the explosion-proof housing with an elongate probe which contains a mirror for reflecting the light from the lamp. The light is reflected normal to the longitudinal axis of the probe.

The viewing periscope also contains a mirror for reflecting light through a lens system for observation by the human eye. The viewing periscope is telescopically arranged so that it may be focused at distances from approximately four inches to infinity. This extensive focal length is particularly useful for the examination of meter tubes and orifice plates in natural gas pipeline metering stations which may be up to 60 feet in length. The viewing periscope does not contain any lamp or wires means and is therefore an explosion-proof apparatus.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are, therefore, not to be considered limiting of its scope, for the invention may admit to other equally effective embodiments.

DESCRIPTION OF THE PREFERRED EMBODIMENT

Figure 1:
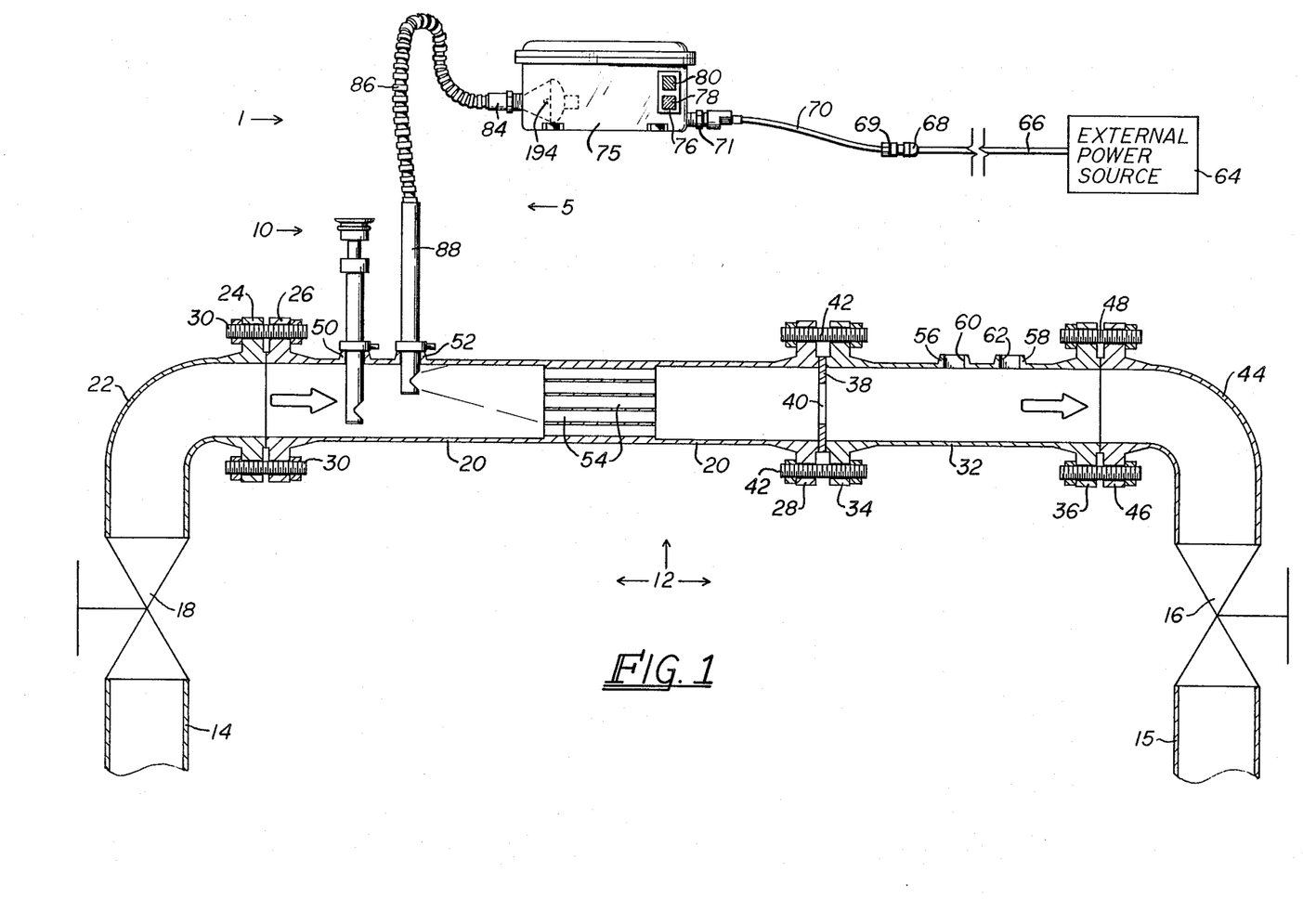
FIG. 1 is a cross-section view of a pipeline metering station with the optical inspection apparatus inserted therein.

Referring to FIG. 1, numeral 1 generally refers to the optical inspection apparatus. Numeral 5 generally refers to the explosion-proof light projector and numeral 10 generally refers to the the viewing periscope. Numeral 12 generally refers to a metering station connected to a natural gas pipeline inlet 14 and outlet 15. The metering station 12 can be isolated from the pipeline pressure by valves 16 and 18. Valve 18 connects to a meter tube 20 by a 90 degree fitting 22. The fitting 22 has a flange 24 formed on one end thereof. The meter tube 20 likewise has a flange 26 formed on one end and another flange 28 formed on the opposite end thereof. Flange 24 of the fitting 22 is connected to flange 26 of the meter tube 20 by several bolts 30 around the flange in a circle. The gas flows through the meter station 12 as indicated by the flow arrows in the piping. Downstream of the meter tube 20 is a spool 32. The spool 32 has a flange 34 formed on one end and another flange 36 formed on the other end.

In between the flange 28 of the meter tube 20 and the flange 34 of the spool 32 is a device well known in the industry and commonly referred to as an orifice plate 38. The orifice plate 38 has a passageway 40 formed in the center thereof. The passageway 40 is precisely cut in the orifice plate 38 so that the amount of gas passing through the meter station can be calculated according to charts and tables provided for that purpose. The orifice plate 38 is held in place between flange 28 and flange 34 by bolt circle 42. The spool 32 connects with valve 16 by a 90 degree fitting 44. The fitting 44 has a flange 46 which abuts flange 36 and is connected by bolt circle 48.

Most meter tubes have a plurality of straightening vanes 54 formed in the upstream portion thereof. These vanes are designed to produce a laminar flow of gas prior to contact with the orifice plate 38. The straightening vanes are designed to reduce turbulence in the gas stream. As is well known in the art, excessive turbulence surrounding the orifice plate reduces the accuracy thereof.

The gas flow path is as follows: from the pipeline 14, through the valve 18 through the fitting 22 through the meter tube 20, through the straightening vanes 54, through the passageway 40 in the orifice plate 38 through the spool 32, the fitting 44, the valve 16 and back to the pipeline 15.

The meter tube 20 has a fitting 50 and a second fitting 52 welded in the side thereof. Both of these fittings contain a passageway which is typically blocked by a bullplug. In FIG. 1 the bullplug has been removed from the fitting 50 and the viewing periscope 10 has been inserted therethrough into the meter tube 20. Likewise, the bullplug has been removed from fitting 52 and the probe 88 has been inserted into the meter tube 20.

A fitting 56 and another fitting 58 are shown in spool 32. Fitting 56 contains a passageway 60 and fitting 58 contains a passageway 62. The passageways 60 and 62 allow communication between the interior of the spool 32 and the exterior thereof. During normal operation of the meter station, the passageways 60 and 62 are blocked by bullplugs, omitted from the drawings.

The light projector 5 as shown in FIG. 1 must be connected to an external power source diagrammatically identified by the numeral 64. The external power source 64 is typically a 110 VAC outlet or portable generator which is electrically connected by one or more conductors 66 to a female explosion-proof connector 68. A male explosion-proof connector 69 mates with connector 68. The connector 69 is electrically connected to one or more conductors 70 which feed into the explosion-proof housing 75. The conductor 70 is joined to the housing 75 by an explosion-proof epoxy connector 71.

The explosion-proof housing has an explosion-proof switch 76 mounted on the exterior thereof. The switch 76 has an "On" button 78 and an "Off" button 80. Inside the explosion-proof housing is a lamp 194 shown in phantom view. When the On switch 78 is depressed, the lamp generates light which is directed through the connector 84 along the fiberoptic light guide 86 and is projected by the probe 88 into the meter tube 20.

Figure 2:
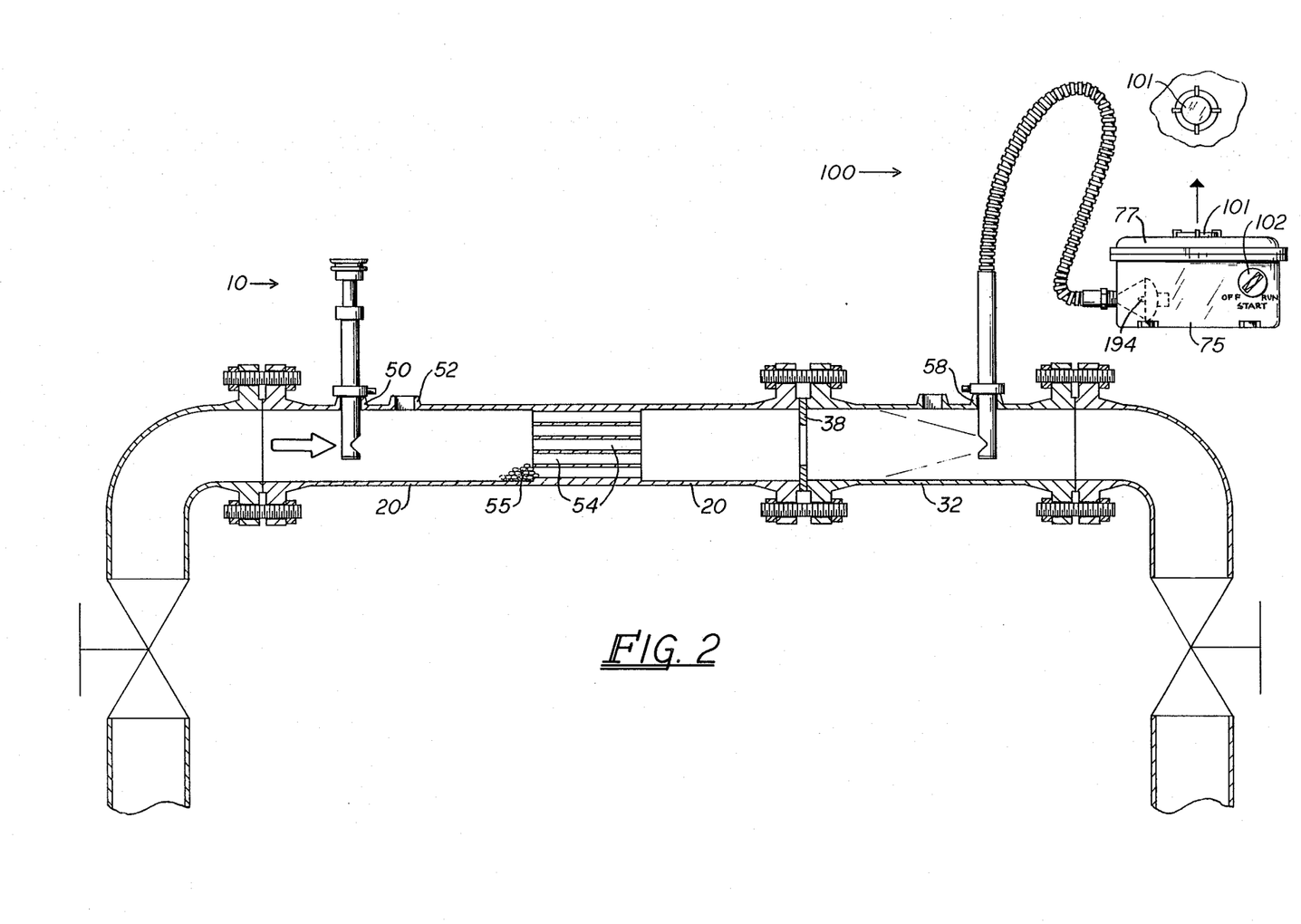
FIG. 2 is a cross-section view of a pipeline metering station with an alternative embodiment of the optical inspection apparatus inserted therein.

Referring to FIG. 2, the metering station 12 is again shown in cross-sectional view. The viewing periscope 10 remains in fitting 50, however, an alternative embodiment of the explosion-proof light projector 100 is shown inserted into fitting 58 of spool 32. This allows easy observation of the straightening vanes 54 and facilitates an evaluation as to whether any of the straightening vanes are clogged or plugged with foreign matter exemplified at 55. A switch 102 is shown on housing 75 of the alternative embodiment of the explosion-proof light projector 100. The switch 102 has three positions. The first position marked "off" turns the entire projector off. The second position marked "start" turns the fan on. The third position, marked "RUN" in FIG. 2, turns the entire projector on, including the fan, the lamp and the power circuit shown in FIG. 4. The battery powered projector 100 has a viewing port 101 in the top 77 of the housing 75.

It should be recognized that the battery powered light projector 100 can be aligned identically to the configuration shown in FIG. 1 by inserting the probe 88 into the fitting 52. Likewise the light projector 5 shown in FIG. 1 can be aligned identically to the configuration shown in FIG. 2 by inserting the probe 88 into the fitting 58.

Figure 3:
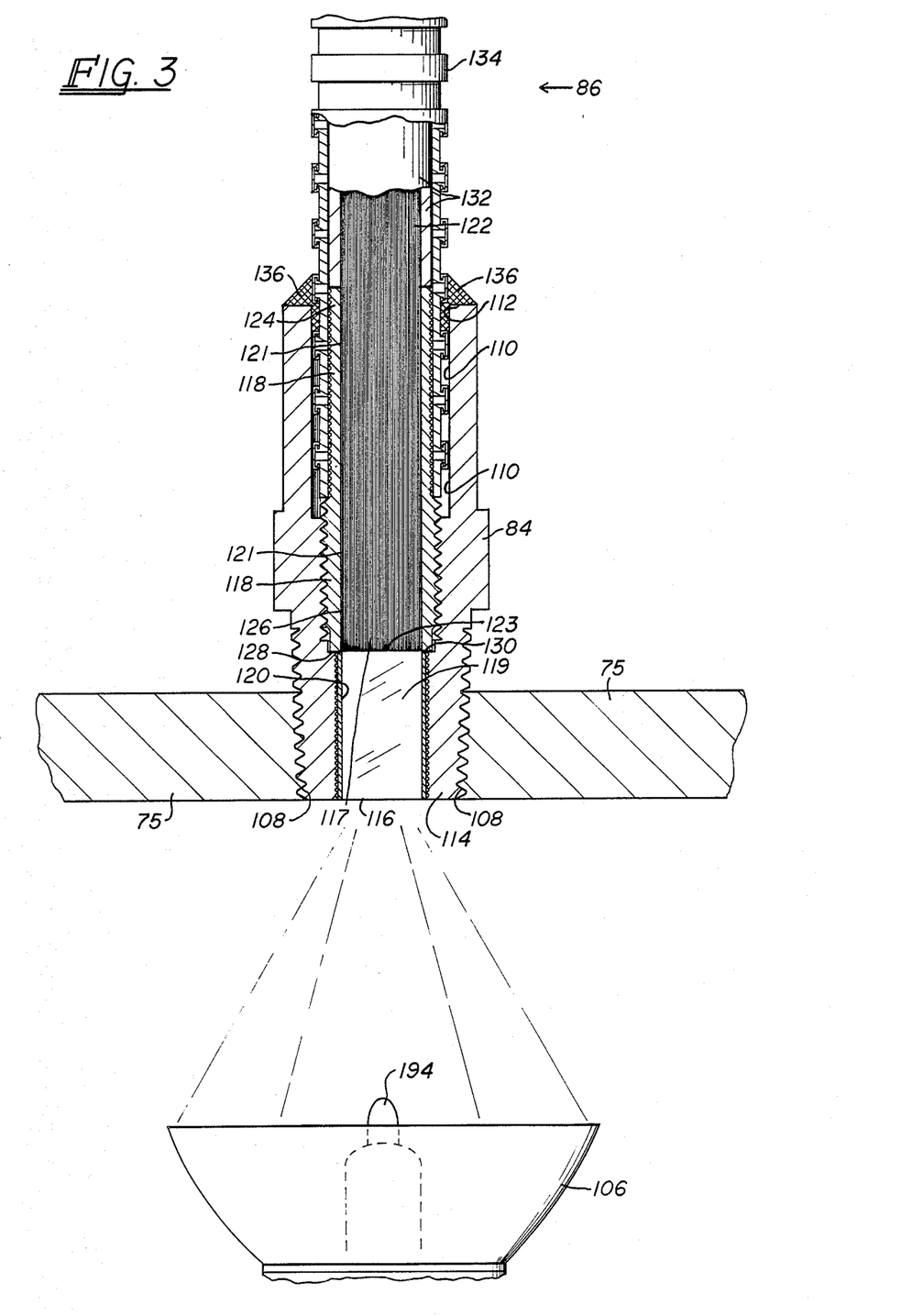
FIG. 3 is a cross-section view of the connector fitted into the explosion-proof housing with a lamp focusing thereon.

Referring now to FIG. 3, the lamp 194 is mounted in a parabolic reflector 106 inside the explosion-proof housing 75. The explosion-proof housing 75 has a fitting 108 formed in a portion thereof. The fitting 108 is sized to threadibly engage the connector 84.

The connector 84 consists primarily of an elongate tube having an longitudinal passageway 110 through the center thereof. The passageway has a first end 112 and a second end 114.

A light transmitting rod 116 is mounted in the second end 114 of the longitudinal passageway 110. The light transmitting rod 116 includes an interior core 119 which is encircled by a sheath 120. The sheath 120 is sometimes referred to as cladding. The sheath, or cladding, has a lower refractive index than the core 119. This allows the cladding or sheath to act as a mirror to improve light transmission by redirecting light from the lamp 194 through the core 119. In the preferred embodiment, a device known as a clad rod manufactured by Applied Fiberoptics, Inc., of Southbridge, Mass. has been found to be a particularly effective light transmitting rod 116. In the preferred embodiment, the rod 116 is made of glass and has a nominal diameter of ⅜ inch.

In the preferred embodiment, a General Electric 150 watt, 21 volt projector lamp and reflector model number DNF has proven to be particularly effective. When the tip of the lamp is placed approximately 1 inch from the housing, the reflector tends to focus the light into a circle with a nominal diameter of ¼ inch on the light transmitting rod which has a nominal diameter of ⅜ inch. Any lamp and reflector known in the art will be suitable for this application and efficiently directs the light emitted therefrom into a circle with a diameter less than the diameter of the light transmitting rod. If the light extends beyond the diameter of the rod, it will be lost for projection purposes and will contribute to unwanted heat build-up in the protective housing. It therefore is inefficient and thermally counterproductive to use a light and reflector which focus a beam of light with a greater diameter than the diameter of the light transmitting rod.

A ferrule 118 has a longitudinal bore 121 formed therein. The fiberoptic light guide, generally referred to by the numeral 86, contains a bundle of fibers 122 which are bonded by clear epoxy or other suitable cement to the bore 121 of the ferrule 118. The fibers 122 in the fiberoptic light guide 86 can be formed into a coherent bundle which will transmit an image or a noncoherent bundle which will merely transmit light. In the preferred embodiment, the fibers 122 are formed into a noncoherent bundle. The ferrule 118 threadibly engages the passageway 110 of the connector 84. The ferrule 118 optically aligns the fibers 122 with the light transmitting rod 116 whereby light generated by the lamp 194 flows through the rod 116 and into the fibers 122.

A clear epoxy resin or other suitable cement bonds one end 123 of the fiber bundle 122 with one end 117 of the rod 116. The index of refraction of the fiber bundle 122 is identical to the index of refraction of the core 118 of the rod 116. The bonding of the fiber bundle 122 to the rod 116 eliminates a surface which would otherwise create reflection. Any internal reflection reduces the ultimate brilliance of the light being projected. Prior art explosion-proof fittings have a reflective surface between the fiber bundle and the explosion-proof lens thus reducing ultimate brilliance.

The ferrule 118 has a first end 124 and a second end 126. A shoulder 128 is formed on the second end 126 of the ferrule 118. The shoulder 128 abuts the rod 116 about its outer circumference 130. In other words, the outside diameter of the rod 116 is larger than the inside diameter of the second end 126 of the ferrule 118. In the unlikely event of an explosion inside the housing 75, the shoulder 128 prevents the rod 116 from being expelled from the connector 84 thereby guaranteeing an explosion-proof connector. In the preferred embodiment the ferrule has an i.d. of 0.375 inches and the clad rod has a nominal o.d. of 0.410 inches providing for a circumferential abutment having a width of approximately 0.030 inches. The second end 114 of the passageway 110 is threaded to receive epoxy resin or other suitable cement to permanently bond the rod 116 in place.

The fiberoptic light guide generally referred to by the numeral 86 comprises three primary components. The fiber bundle 122 forms the central portion of the fiberoptic guide 86. As a matter of convenience and durability, the fibers 122 are encircled by a flexible, tubular plastic hose 132. The plastic or elastomeric hose 132 is encircled by a flexible metallic casing 134. The metallic casing 134 is soldered to the first end of the passageway 112 of the connector 84 as shown by the crosshatching 136. The solder 136 is primarily a manufacturing convenience and is not essential to the functioning of this explosion-proof connector 84. The ferrule 118 is threaded along its first end 124 to receive epoxy which permanently bonds the interior of the metallic casing 134 to the ferrule 118.

Figure 4:
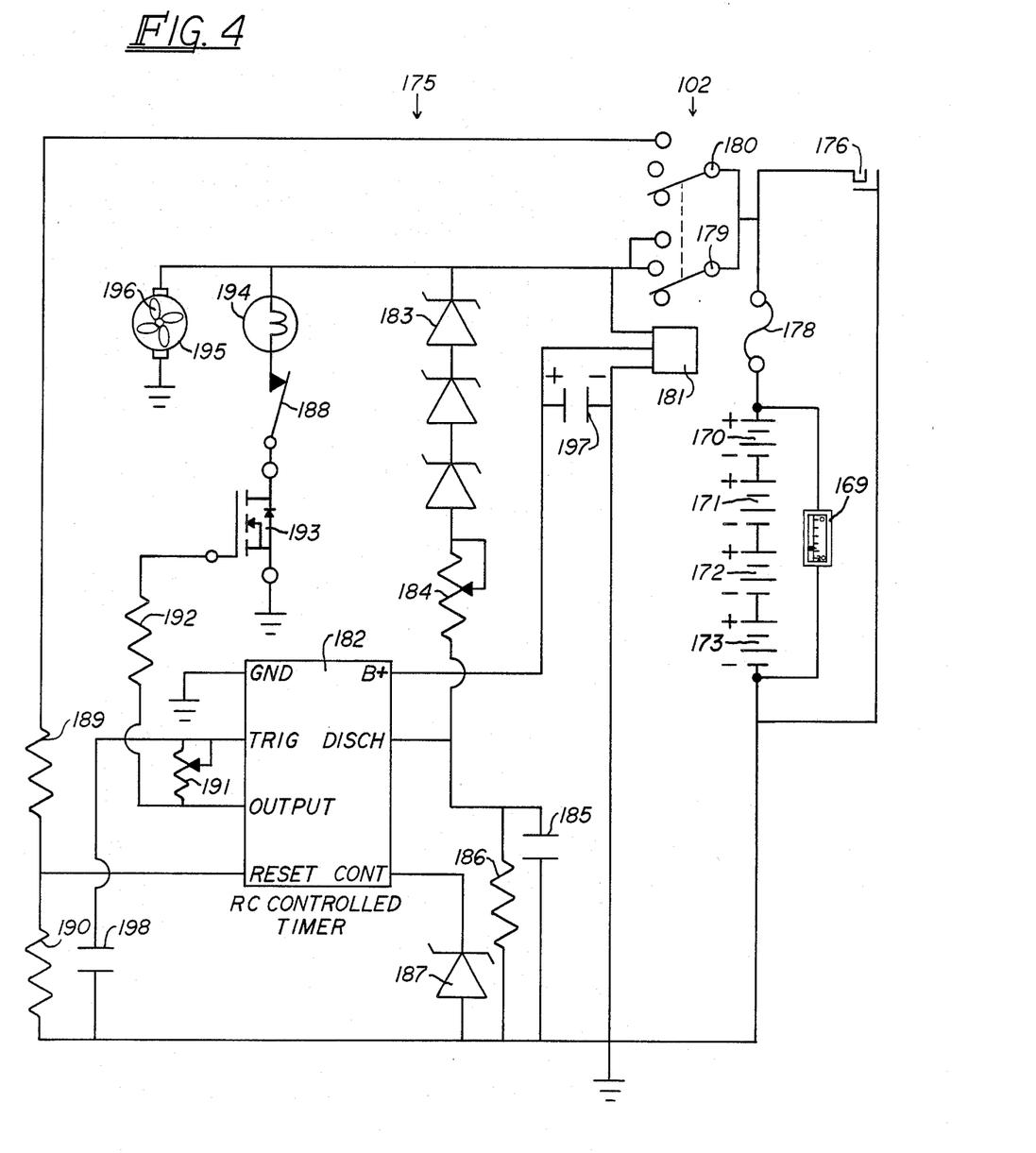
FIG. 4 is a schematic of the circuit used in the battery powered embodiment of the optical inspection apparatus.

Attention is now directed to FIG. 4 of the drawings where a battery powered circuit for operation of the lamp is illustrated. This power system is identified generally by the numeral 175. The system 175 shown in this view is completely enclosed within the explosion-proof housing except that the operating switch protrudes to the exterior of the housing for easy operation. This power system operates to provide electrical power to the lamp, and this power is sustained for a duration. Depending on the size of the battery or batteries utilized in the the explosion-proof housing, the lamp can be illuminated for a minimum of about 25 minutes, typically about 30 minutes before the battery or batteries become sufficiently discharged that recharging is required.

Beginning therefore with the circuitry shown, the numeral 176 identifies a covered explosion-proof plug which is readily engaged with a battery charger-which furnishes a charging current to charge the batteries 170, 171, 172 and 173. The batteries 170, 171, 172 and 173 have a combined nominal rating of 24 volts; in the preferred embodiment four six volt gel type rechargeable batteries are connected in series which combines to produce 24 volts. At full charge, that typically suggests a terminal voltage of about 27 to 29 volts. After discharge, the terminal voltage will sag as slow as about 20 or 21 volts. The batteries 170, 171, 172 and 173 are protected by a series fuse 178 to prevent excessive discharge current, e.g., a system short circuit.

The operating switch shown in FIG. 2 is generally referred to by the numeral 102 and is double pole triple throw. The numeral 179 identifies a first pole which applies battery terminal voltage first to the fan motor 195 at the "start" position, and at the "run" position provides voltage to the circuitry including the lamp and fan. There is additionally a second pole 180, the pole 180 being ganged to the pole 179 for closure therewith. They are preferably ganged so that the pole 179 closes on the "run" pole a fraction of a second before the pole 180 closes on the "run" pole. It is desirable to operate in this mode, namely that the pole 180 closes slightly behind the pole 179. This cooperates with the circuitry to be described to enable the switch 102 to close with a minimum current flow across the pole 179 at start. Otherwise, the current can be upwards of 10 amps which would typically pit the contacts of the switch, thereby requiring an expensive switch or else excessive replacement. The slight delay in closure enables the pole 179 to close with substantially no current flow across the terminals at closure. The current thereafter increases subject to control of the pole 180. This will be explained in detail.

The numeral 181 identifies a voltage regulator which forms a reduced and regulated output voltage. This reduced voltage is applied to an RC control timer circuit 182. This circuit, typically in the form of an IC chip, incorporates several terminals. The regulated voltage thus enables the timer circuit 182 to operate. The pole 179 also furnishes a positive voltage to an RC discharge circuit. This circuit measures the battery terminal voltages and tracks that terminal voltage. Battery terminal voltage fluctuates over a very wide range. If the battery were simply connected straight to the lamp 194, it would probably burn out the lamp when the battery is charged fully, i.e., to 27-29 volts. There would be a tremendous drop in lamp life. Alternatively, a heavy duty lamp could be used which could withstand the current flow when the battery is charged to the maximum, but then the lamp would dim as battery terminal voltage dropped. In the preferred embodiment the lamp 194 has a 150 watt rated capacity and will typically burn out if voltage rises to 23 or 23.5 volts.

The voltage from the batteries 170, 171, 172 and 173 is thus monitored by this RC discharge circuit. This particular circuit includes a string of Zener diodes at 183 and an adjustable resistor 184. That circuit connects to ground through a charging capacitor 185, a charge being accumulated on the plates of that capacitor. The charge on the capacitor is bled to ground through a resistor 186, thus forming the RC timing circuit. The voltage on the plates of the capacitor 185 varies depending on the adjustment of the resistor 184 and the operation of the diodes 183. When battery voltage is high, the voltage on the capacitor 185 is relatively high. The timer circuit 182 has an input terminal which monitors the charge on the capacitor 185. If that charge increases the input voltage at the terminal, the timer circuit 182 operates to place a resistor in parallel with the resistor 186, thereby increasing the rate at which the capacitor 185 is discharged. The timer circuit 182 includes a control terminal connected through Zener diode 187 to ground to obtain a reference level. It compares the voltage on the capacitor 185 with a reference voltage and periodically provides a small resistor parallel to the resistor 186 thereby making a prompt discharge of the capacitor 185. This discharge requires a finite time interval. That interval will ultimately become the half-cycle interval referring to the duty cycle of the operation of the lamp.

The timer additionally includes a ground terminal. There is also a reset terminal which is subject to control of the pole 180. Tracing from the pole 180, it connects by means of a conductor with two series resistors 189 and 190 which operate as a voltage divider to apply a reset voltage to the timer 182. The pole 180 closes slightly behind the pole 179 and thus applies a reset signal to the timer 182 to enable it to operate. The timer then operates, forming an output voltage which is used to switch on the gate of an FET (to be described). The output signal is thus a positive gating signal. The gating signal is used to switch the lamp on as will be described.

A variable resistor 191 is used to adjust the threshold level for the FET. The output signal is delivered from the output terminal through a series resistor 192 and is applied to the gate of an FET 193. This is connected serially with a lamp 194. The lamp 194 is thus provided with power from the battery, and a ground connection is controlled by the FET 193. If the FET permits, the current will flow and the lamp will be illuminated. The FET is switched off and on to thereby control current flow through the lamp 194. A thermostat switch 188 is serially connected between the lamp 194 and the FET 193. The thermostat switch 188 is included in the event the equipment becomes excessively hot in the closed explosion-proof housing. In the preferred embodiment, the thermostat switch is set to open at 185° F. If the thermostat observes this high temperature, it simply operates to open the switch 188 which completely defeats operation of the lamp 194. In other words, it will stop operation of the lamp but not the fan. The lamp generates heat but the passage of time (during the thermostat operation to reset) enables heat to be dissipated. The switch 188 is presumably closed during normal operation of the lamp.

Additional components as shown in the system at 175 include a fan motor 195 which rotates the fan 196 for cooling the region around the lamp 194 and the interior of the explosion-proof housing 75. This enables heat to be distributed away from the lamp into the wall of the explosion-proof housing 75. The numeral 197 identifies a filtering capacitor which assures that the regulated voltage has a minimum of high frequency components. In like fashion, the numeral 198 identifies another capacitor which functions in the same fashion.

Operation of the circuitry should be considered. To pose the situation, the batteries are presumed to be charged to the maximum which is typically around 27 or 28 volts. This voltage is excessive for the lamp 194. This excessive high voltage is noted at the RC circuit including the capacitor 185. In other words, the capacitor 185 charges rapidly to a high level. It is high, a fact sensed by the timer circuit 182 in contrast with the referenced voltage. This timer then responds to this high voltage by forming a gating signal applied to the gate of the FET 193 to switch off the transistor 193. The timer is adjusted and controlled so that it has a duty cycle which cannot be observed by visual inspection of the human eye. That is, the transistor 193 is gated off for a short interval. The current is instantaneously zero; the lamp, however, is incandescent and therefore continues to glow as it is cooling. Before it becomes cool and thereby emits no light, the timer switches on to enable the current to flow through the lamp. The duty cycle is relatively short, meaning the current flow is a relatively small percentage of the total cycle. However, the batteries discharge over a period of time. As terminal voltage drops from perhaps 28 volts to 24 volts, the duty cycle as sensed by the timer is different. As terminal voltage drops, the time required to charge the capacitor 185 increases. This increased charging interval is noted by the timer 182. Recall that the timer 182 functions to effectively place a second resistor parallel with the resistor 186, thereby discharging the capacitor 185. The rate of discharge and recharge of the capacitor 185 controls the duty cycle. As terminal voltage of the battery drops, the duty cycle is changed. That is, current flows longer and the interruptions of current flow are shorter and less frequent. Again, the interruptions to current flow are implemented in the same way, namely by switching or gating the FET 193.

Ultimately, the terminal voltage will drop so low that the capacitor 185 will never charge, and then the timing circuit simply holds the transistor 193 on indefinitely. At this point, the last portion of charge stored in the battery is pulled from the battery and the lamp operates with current flow continuously. The lamp will ultimately dim to visual observation, but this occurs only when the battery has been so depleted that it requires recharging. Thus, the duty cycle (varied as described above) will cause the lamp to provide a more or less continuous measure of illumination until it begins to dim, indicative of the fact that the batter is substantially discharged. Since this depends on battery terminal voltage, it provides a substantially constant light output as long as the battery terminal voltage exceeds a specified value, say 22 volts. In the preferred embodiment, a 21 volt 150 watt lamp is preferably used, it being understood that the nominal rating of the lamp indicates an approximate voltage at which 100% of the lamp rated output is obtained. Thus, even as battery voltage sags from about 28 to about 21 volts, 100% light output is obtained. If battery voltage drops to perhaps 16 volts, the lamp will be substantially dim, perhaps even yielding no useful illumination. When this happens, it is simply indicative that the lamp has depleted the charge on the battery.

In practice, the resistor 186 is built in the IC chip making up the timer 182. The discharge path is also in the timer IC chip. The chip used in the preferred embodiment is manufactured by Motorola, Model No. NE555; however, a different chip from another manufacturer which performs the same function would be equally suitable.

A voltage meter 169 connects to the positive terminal of battery 170 and the negative terminal of battery 173 to measure the combined voltage of the plurality of batteries 170, 171, 172 and 173. In the preferred embodiment the volt meter has a range of 0-30 volts.

In summary, the circuitry 175 controls current flow delivered to the lamp to thereby enable the lamp to operate with a regulated light input. This is continued as long as the battery charge will enable such operation whereupon battery depletion interferes with lamp operation. Depending on the storage capacity of the battery, this typically is in the range of 25 or perhaps 30 minutes.

Figure 5:
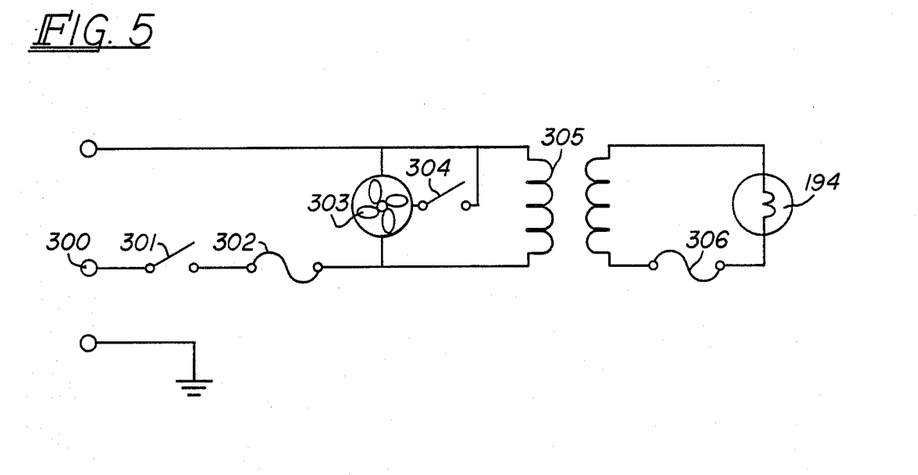
FIG. 5 is a schematic of the electrical circuit when a remote AC power source is available.

Referring to FIG. 5, an AC circuit is shown as follows:

In FIG. 5, an AC circuit for the system is shown. A suitable power card provides power to a set of terminals 300 on the interior of the housing. The terminals connect to a switch 301 which in turn connects through a fuse 302 to a fan motor 303. The motor cools the interior by circulating air to reduce hot spots. The motor is switched off and on by a thermostat controlled switch 304 to cool when the observed temperature is above a specified limit. The switch 301 controls power applied to a transformer 305 which connects as its secondary to the lamp previously described. The lamp 194 is provided with proper operating voltage by the transformer 305 through a lamp fuse 306.

Figure 5A:
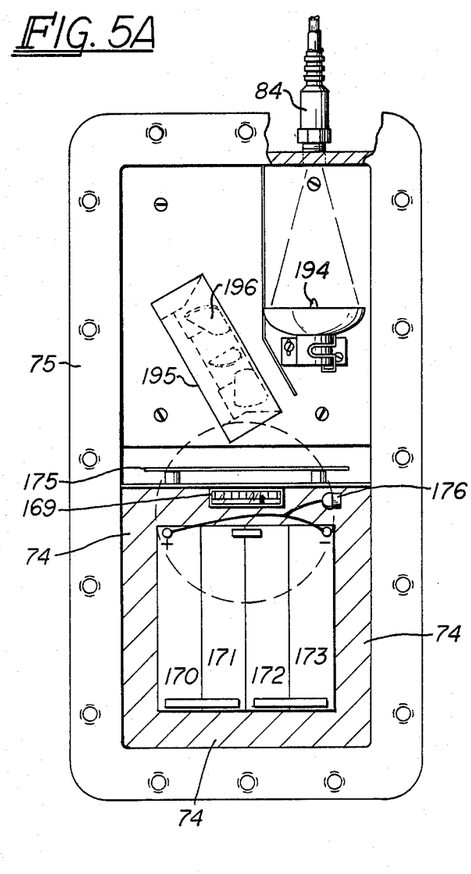
FIG. 5A is a front view of the interior of the protective housing showing the insulated batteries and the spatial arrangement of the other components housed therein.

Referring to FIG. 5A, a perspective view of the interior of the protective housing 75 shows the batteries 170, 171, 172 and 173 fully surrounded with a shaped insulation 74. The power system 175 is mounted adjacent the insulation 74. The fan motor 195 rotates the fan 196 which is directed towards the lamp 194 for cooling thereof. The explosion-proof connector 84 is shown mounted in the housing 75. The batteries 170, 171, 172, and 173 have a plurality of parallel lead plates therein which do not touch each other. If the batteries get too hot, it may cause the plates to warp and touch each other, thus shorting out the battery. The insulation around the batteries 170, 171, 172, and 173 reduces the amount of heat which they absorb thereby reducing untimely battery failure. The viewing port 101 is shown in phantom above the voltmeter 169 and the recharge plug 176.

Figure 5B:
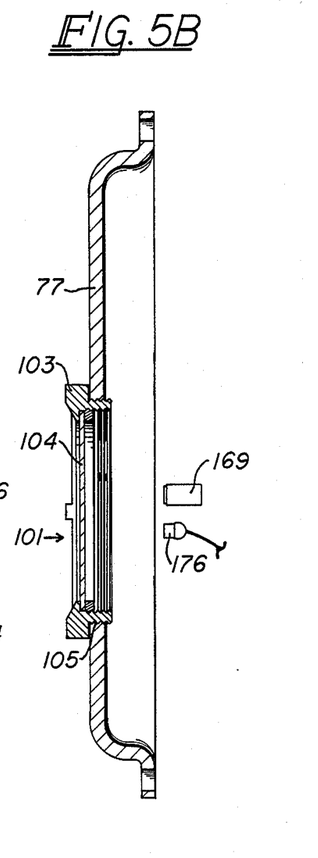
FIG. 5B is a cross-section view of the top of the explosion-proof housing showing the viewing port and volt meter.

Referring to FIG. 5B, the top 77 of the housing 75 has a viewing port 101 therein. The voltmeter 169 can be visually observed through the viewing port 101. The top 77 has a threaded hole 105 therein. An explosion-proof plug 103 threadibly engages the hole 105. The plug 103 has an explosion-proof lens 104 secured in the center thereof allowing an observer to view from the exterior to the interior of the housing 75. The hole 105 and the lens 104 form the viewing port 101. The recharge plug 176 can be easily accessed by removal of the plug 103.

Figure 6:
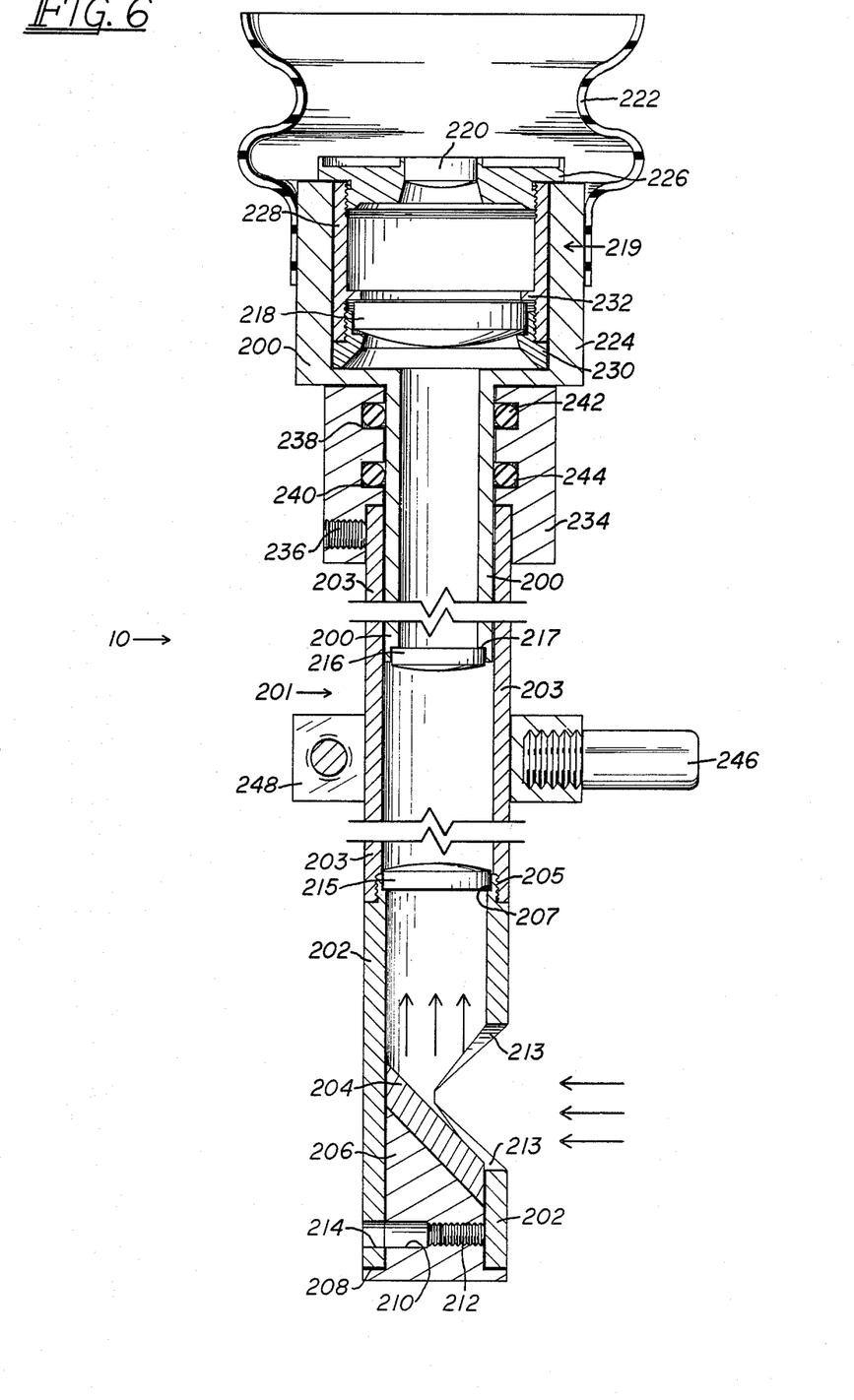
FIG. 6 is a cross-section of the viewing periscope.

Referring to FIG. 6, the viewing periscope 10 is shown in cross-sectional view. The periscope in the preferred embodiment has a field of view of approximately 8° and a nominal outside diameter of 11/16 inches. The periscope has a body formed by two telescoping tubes. The interior tube 200 fits inside the exterior tube 201. The exterior tube 201 is formed by two sections; a lower section 202 and an upper section 203 joined together at 205. A front surface mirror 204 is mounted on a base 206. The mirror 204 and the base 206 are sized to fit inside the interior diameter of the tube 202. The base 206 has a shoulder 208 which abuts the tube 202. The base 206 has a hole 210 drilled therein which is sized and threaded to receive a setscrew 212. A port 214 is drilled in the tube 202 to allow access to the hole 210 and to adjust the setscrew 212. When fully adjusted, the setscrew mechanically locks the base 206 and the mirror 204 inside the tube 202. An aperture 213 is formed in the tube 202 to allow light, shown by the arrows in FIG. 6, to enter the tube and to be reflected from the mirror 204 up the tube. The tube 202 threadibly engages the upper section 203 at joint 205.

A seat 207 is formed in the tube 202 to receive an objective lens 215. In the preferred embodiment, the objective lens 215 is achromatic having a 14 mm diameter and a 56 mm focal length. The lens 215 is epoxied into place in the seat 207.

An intermediary lens 216 is mounted in a seat 217 at the end of the tube 200. The intermediary lens 216 in the preferred embodiment is achromatic having a 13 mm diameter and a 49 mm focal length. The lens 216 is epoxied into place in the seat 217.

An eyepiece assembly is generally identified by the numeral 219. The eyepiece assembly in the preferred embodiment has 10X magnification and can be inserted and removed from the tube 200 as a unit. Using a 10X eyepiece assembly, the entire system has a total magnification of approximately 1.5 when focused at infinity. When focused at shorter distances, the magnification increased. If a 20X eyepiece were used, the entire system would have a total magnification of approximately 3X when focused at infinity. Various other combinations are possible to increase or decrease the total magnification of the entire periscope 10. The eyepiece assembly has a first lens 218 and an ocular lens 220. The ocular lens mounts in a ring 226 which threadibly engages a sleeve 228. A mount 230 threadibly engages sleeve 228 and supports the lens 218 in seat 232.

The mirror 204 is optically aligned with the ocular lens 220, intermediary lenses 218 and 216 and the objective lens 215, such that light passing through the aperture 213 is reflected from the mirror 204 through the objective lens 215, the intermediary lenses 216 and 218 and through the eyepiece 219.

Focusing of the periscope 10 can be accomplished by axial movement of the interior tube 200 inside of the exterior tube 201. An elastomeric, accordion-like eyepiece 222 mounts on the uppermost section of tube 200 at 224. The eyepiece 222 serves to exclude outside light and to facilitate viewing through the periscope 10.

The exterior tube 201 is received by an encircling collar 234 which is attached to the tube 201 by a setscrew 236. A channel 238 is cut along the interior diameter of the collar 234. A second channel 240 is likewise cut in the interior diameter of the collar 234. A first O-ring 242 and a second O-ring 244 fit respectively into channels 238 and 240. In the preferred embodiment it is useful to lubricate the tube 200 to facilitate axial movement past the O-rings 242 and 244. An orienting pin 246 is mounted in a lock collar 248 on the exterior tube 201. The orienting pin 246 and the lock collar 248 are better seen in sectional view in FIG. 7A.

Figures 7, 7A:
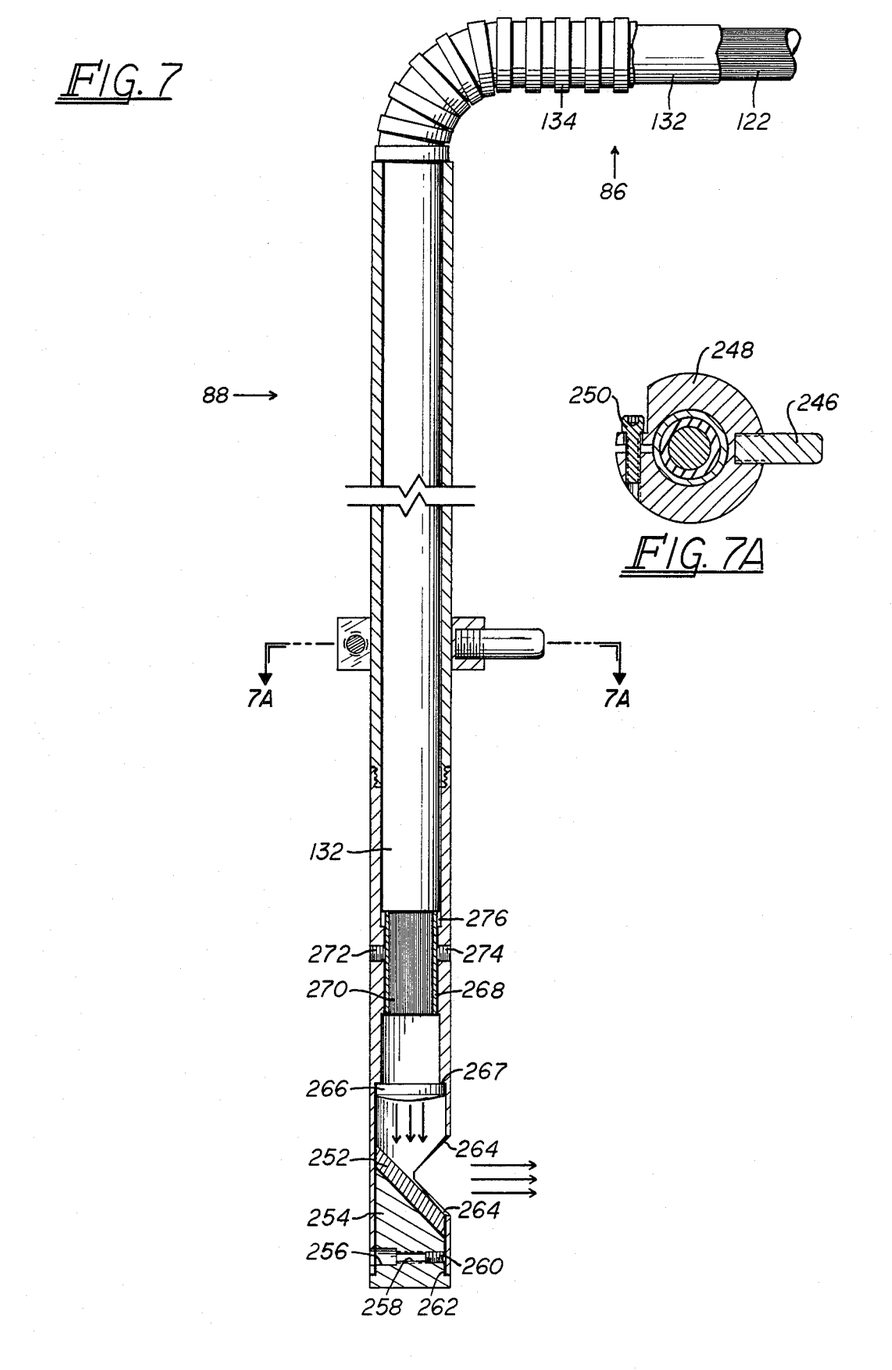
FIG. 7 is a cross-section view of the probe which connects to the fiberoptic light guide.
FIG. 7A is a section view of the orienting ring taken along lines 7—7 of FIG. 7.

Referring to FIG. 7A, an allen head screw 250 joins the split sections of the locking ring 248. The same type of orienting pin and locking collar is used on both the periscope 10 and the probe 88.

Referring to FIG. 7, the probe 88 is shown in sectional view. The probe 88 has a nominal outside diameter in the preferred embodiment of 11/16 inches; it projects a light beam with a divergency of approximately 20°. A front surfaced mirror 252 is mounted on a base 254 which fits into the inside diameter of the probe 88. A port 256 is formed in the periscope 88. A passageway 258 is formed in the base 254 to receive a setscrew 260. The base 254 has a shoulder 262 which engages the lower portion of the probe 88. The setscrew 260 can be accessed through the port 256 and the passageway 258. The setscrew 260 mechanically grips the probe 88, holding the base 254 and the mirror 252 firmly in place. An aperture 264 is formed in the probe 88. A lens 266 is mounted on seat 267 inside the probe 88. The lens 266 in the preferred embodiment is achromatic having a 15 mm diameter and a 25 mm focal length; a antireflective coating is applied to the exterior surfaces of this lens. The lens 266 is epoxied into the seat 267 inside the probe 88. The lens 266 is optically aligned so that light passing from the lamp through the fiberoptic light guide 86 will strike the mirror 252 and project out of the aperture 264.

The three part fiberoptic cable 86 is clearly shown in FIG. 7. The fiber bundle 122 is encased by a plastic hose 132 which is armored and protected by a metallic casing 134. A stainless steel ferrule 268 is formed around the second end 270 of the fiber bundle 122. The stainless steel ferrule 268 is mechanically gripped by one or more setscrews 272 and 274. A channel 276 is formed in the probe 88, allowing adjustment of the ferrule 268 to better focus the light through the lens 266 to the mirror 252.

Focusing of the light from the probe 88 is a two step process. First, the light should be focused into the smallest possible point on the mirror by adjusting the distance between the end 270 of the fiber bundle and the lens 266. This will result in the image of the end of the bundle 270 being projected by the mirror. This is undesirable because certain dark spots will appear where the individual fibers are epoxied to each other. The second step in focusing requires the ferrule 268 to be retracted approximately 1/32 inches and locked in place by set screws 272 and 274. The second procedure places the image slightly out of focus and eliminates any perceptible dark spots formed when the image is in exact focus.

OPERATION OF THE PORTABLE BATTERY POWERED EMBODIMENT

In order to assure accurate measurement through meter stations, it is a standard procedure for meter tubes to be checked at regular intervals, at least once a year and sometimes more often in areas of dirty service. Conventionally, meter tubes have been removed from a piping system by disconnected the bolt circle at both flanges to allow direct visual observation of the interior of the tube, including the straightening vanes and the orifice plate. This removal procedure is cumbersome and manually intensive.

In the industry, removing meter tubes for examination is commonly referred to as "rolling" a meter tube. It typically takes a crew of four men to roll and reinstall a tube. In order to cut down on operating expenses, it would be highly desirable to be able to examine a meter tube and orifice plate at the required intervals without having to manually disconnect it from the piping system unless it needed to be internally cleaned. The present invention provides an apparatus whereby meter tubes, orifice plates, straightening vanes and other internal apparatus in natural gas pipelines can be examined without having to manually disassemble the piping configuration.

In addition, the explosion-proof features of the present invention allow this inspection to occur in complete safety without having to first flush the line of its explosive contents. The present invention can also be used for examining any other type of instrumentation in a natural gas pipeline such as a turbine flowmeter or a vortex shedding meter without removal thereof. All that is required for application of the present invention is the presence of two or more ½ inch NPT fittings in the piping configuration to allow insertion of the light projector and the viewing periscope. Any fittings having a nominal inside diameter as small as 23/32 inches will be acceptable for this purpose. In the preferred embodiment, the periscope has a normal o.d. of 11/16 inches and the probe has a normal o.d. of 11/16 inches. If cleaning of the meter tube is required then, and only then, will it be necessary to manually disassemble at the bolt circle and "roll the tube". This saves a tremendous amount of money in operating maintenance compared to the conventional system of manually disassembly for each and every inspection.

To perform an inspection of a meter tube with the present invention, the piping system must first be isolated from pipeline pressure using one or more valves. After the piping system has been isolated from the pipeline, the residual pressure will be vented to atmosphere. Because the present invention is explosion-proof, it will not be necessary to flush or further evacuate any flammable liquids or gases from the piping system. Plugs should be removed from one or more fittings to allow access for the light probe and the viewing periscope. The aperture in the viewing periscope projects further into the pipeline than the aperture contained in the probe of the light projector whereby both the projector and the periscope can be aligned in tandem as shown in FIG. 1 without blocking the view in the periscope.

In the alternative, the light projector and the viewing periscope can be inserted opposite one another in a piping system as shown in FIG. 2. The arrangement in FIG. 2 is particularly useful for viewing any obstructions in the straightening vanes.

A visual inspection of a typical meter run, regardless of size, will typically take one man less than five minutes using the present invention. After conclusion of the inspection, the switch should be turned from the "Run" position to the "Start" position which turns the lamp off but allows the fan to continue to run for cooling purposes. After a cool down period of approximately one minute, the apparatus should be switched to the "Off" position. The cool down period is not essential to operation of the apparatus; however, it will prolong the life of the lamp, the batteries, and the circuit inside of the explosion-proof housing.

In the unlikely event that an explosion should occur inside of the housing, any hot parts will be contained therein for a long enough period of time to prevent ignition with any explosive fluids contained in the outside atmosphere.

The present invention has other industrial applications too numerous to discuss in detail in this application. The foregoing explanation of operation was directed to only one type of application solely for illustrative purposes. The invention can be used to examine any tank, vessel or enclosed structure.

While the foregoing is directed to the preferred embodiments of the present invention, other and further embodiments of the invention may be devised without departing from the basic scope thereof, and the scope thereof is determined by the claims which follow.

What is claimed is:

1. A light projecting apparatus for use in an explosive atmosphere comprising:
   (a) An explosion-proof housing having a fitting formed in a portion thereof, said fitting allowing communication between the interior and exterior of said housing for protectably enclosing;
      (i) an electric lamp;
      (ii) power means forming a current flow to be supplied to said lamp to operate said lamp and form light by the operation thereof;
      (ii) circuit means controllably switching said lamp on by providing a current flow thereto from said power means;

(b) a flexible fiberoptic light guide having first and second ends;

(c) an explosion-proof connector sized to releasably engage said fitting of said housing, said connector including;
   (i) a passageway through said connector having first and second ends, said first end of said passageway receiving said first end of said guide;
   (ii) a light transmitting rod mounted in said second end of said passageway, said connector positioning said guide and said rod in optical alignment to receive and transmit light from said lamp; and (d) probe means receiving said second end of said guide for directing light from said lamp to an area to be visually inspected in an area subject to said explosive atmosphere.

2. The apparatus of claim 1 wherein said probe means further includes:
   (a) a tubular body having first and second ends, said second end having an aperture therein normal to the longitudinal axis of said body;
   (b) a mirror mounted in said second end of said body and optically aligned with said aperture to reflect light from said lamp through said aperture;
   (c) a lens mounted in said body between said mirror and said second end of said cable; and
   (d) means for gripping said second end of said light guide for adjusting the distance between said guide and said lens.

3. The apparatus of claim 1 wherein:
   (a) said power means is a DC battery; and
   (b) including a power flow regulating means connected between said lamp and said battery for regulating power delivered to said lamp over an interval notwithstanding variations in battery output voltage.

4. The apparatus of claim 3 wherein said power flow regulating means responds to battery output voltage to vary battery current flow to said lamp so that average power to said lamp is sustained by increasing current flow with decreasing battery output voltage.

5. The apparatus of claim 4 wherein the current flow is varied by chopping current flow with a variant switching cycle.

6. The apparatus of claim 4 wherein said power flow regulator means includes:
   (a) an FET serially connected with said lamp;
   (b) a gating circuit connected to the gate of said FET; and
   (c) said gating circuit including a voltage sensitive timing circuit responding to battery output voltage to switch current flow off and on by controlling the signal applied to the gate of said FET.

7. The apparatus of claim 4 further including thermostat means including a switch for responding to excessive temperature levels in said housing wherein the switch of said thermostat is connected to defeat current flow to said lamp.

8. The apparatus of claim 4 further including an electric motor connected to a fan blade for cooling the interior of said housing by creating air movement therein and wherein said fan motor is connected to said battery for operation thereby.

9. The apparatus of claim 2 further including an explosion-proof switch mounted on the exterior of said explosion-proof housing, said switch having an on position, and off position, and a third position wherein said lamp is off and said fan is on, said switch connected to said circuit means.

10. An optical inspection apparatus for use in an explosive atmosphere comprising:
   (a) An explosion-proof housing having a fitting formed in a portion thereof, said fitting allowing communication between the interior and exterior of said housing for protectably enclosing;
      (i) an electric lamp;
      (ii) power means forming a current flow to be supplied to said lamp to operate said lamp and form light by the operation thereof;
      (iii) circuit means controllably switching said lamp on by providing a current flow thereto from said power means;
   (b) a flexible fiberoptic light guide having first and second ends;
   (c) an explosion-proof connector sized to releasably engage said fitting of said housing, said connector including;
      (i) a passageway through said connector having first and second ends, said first end of said passageway receiving said first end of said guide;
      (ii) a light transmitting rod mounted in said second end of said passageway, said connector positioning said guide and said rod in optical alignment to receive and transmit light from said lamp;
   (d) a probe means receiving said second end of said guide for directing light from said lamp to an area to be visually inspected in an area subject to an explosive atmosphere; and
   (e) a periscope including;
      (i) a telescopic body having first and second ends, said second end having a viewing aperture;
      (ii) an ocular lens mounted in said first end of said body;
      (iii) a mirror mounted in said second end of said body and optically aligned with said viewing aperture to reflect light passing through said aperture towards said ocular lens;
      (iv) an objective lens mounted in said body between said mirror and said ocular lens;
      (v) one or more intermediary lenses mounted between said objective lens and said ocular lens; and
      (vi) means for adjusting the focal length of said periscope by adjusting the distance between said intermediary lenses and said objective lens.

11. The apparatus of claim 10 wherein said probe means and said periscope are sized to fit through ½ inch NPT fittings.

* * * * *

UNITED STATES PATENT AND TRADEMARK OFFICE
CERTIFICATE OF CORRECTION

PATENT NO. : 4,777,567

DATED : October 11, 1988

INVENTOR(S) : Welker et al.

It is certified that error appears in the above-identified patent and that said Letters Patent is hereby corrected as shown below:

Title page, Assignee should read -- Welker Engineering Company --.

Signed and Sealed this

Seventh Day of March, 1989

Attest:

DONALD J. QUIGG

*Attesting Officer*   *Commissioner of Patents and Trademarks*